(12) United States Patent
Davis

(10) Patent No.: US 12,462,101 B2
(45) Date of Patent: Nov. 4, 2025

(54) CONTEXT-BASED NATURAL LANGUAGE PROCESSING

(71) Applicant: Document Crunch, Inc., Atlanta, GA (US)

(72) Inventor: Quentin Davis, Katy, TX (US)

(73) Assignee: Document Crunch, Inc., Atlanta, GA (US)

( * ) Notice: Subject to any disclaimer, the term of this patent is extended or adjusted under 35 U.S.C. 154(b) by 0 days.

(21) Appl. No.: 18/088,348

(22) Filed: Dec. 23, 2022

(65) Prior Publication Data

US 2024/0211686 A1    Jun. 27, 2024

(51) Int. Cl.

| G06F 40/279 | (2020.01) |
| G06F 40/169 | (2020.01) |
| G06F 40/284 | (2020.01) |
| G06F 40/289 | (2020.01) |
| G06F 40/295 | (2020.01) |
| G06F 40/30 | (2020.01) |
| G06N 20/00 | (2019.01) |

(52) U.S. Cl.
CPC .......... *G06F 40/279* (2020.01); *G06F 40/169* (2020.01); *G06F 40/284* (2020.01); *G06F 40/289* (2020.01); *G06F 40/295* (2020.01); *G06F 40/30* (2020.01); *G06N 20/00* (2019.01)

(58) Field of Classification Search
CPC ....... G06F 40/279; G06F 40/169; G06F 40/30
USPC ......................................................... 715/231
See application file for complete search history.

(56) References Cited

U.S. PATENT DOCUMENTS

| 9,898,457 | B1* | 2/2018 | Mohanty | G06F 40/284 |
| 10,331,788 | B2* | 6/2019 | McAteer | G06F 40/30 |
| 10,878,505 | B1* | 12/2020 | Blair | G06F 18/24 |
| 11,321,538 | B1* | 5/2022 | Fontecilla | G06F 40/40 |
| 11,520,815 | B1* | 12/2022 | Gutta | G06Q 50/18 |
| 11,545,141 | B1* | 1/2023 | Poddar | G06F 40/30 |
| 11,809,477 | B1* | 11/2023 | Ghosh | G06F 40/30 |
| 12,033,412 | B2* | 7/2024 | Iyer | G06F 40/169 |
| 2015/0205782 | A1 | 7/2015 | Subramanya et al. | |

(Continued)

FOREIGN PATENT DOCUMENTS

| WO | WO-2018213763 A1 * | 11/2018 | F02B 67/06 |
| WO | WO-2021134432 A1 * | 7/2021 | G06F 40/20 |

OTHER PUBLICATIONS

Provision; Mar. 3, 2021; merriam-webster.com; pp. 1-7.*

(Continued)

*Primary Examiner* — Roberto Borja
(74) *Attorney, Agent, or Firm* — Fish & Richardson P.C.

(57) ABSTRACT

Approaches for training and invoking natural language processing (NLP) models are described. In one aspect, a method includes obtaining a natural language document and accessing a database that includes NLP models. A first set of NLP models are configured to recognize a first provision. A second set of NLP models are configured to recognize a second provision. The method includes obtaining a user input indicative of a set of provisions. For at least one given provision in the set of provisions, the method include identifying corresponding NLP models in the database, applying a first NLP model to create a first annotated natural language document; inputting the first annotated natural language document to a second NLP model; and outputting the natural language document annotated with the set of provisions.

20 Claims, 5 Drawing Sheets

(56) References Cited

U.S. PATENT DOCUMENTS

| | | | |
|---|---|---|---|
| 2017/0235888 A1* | 8/2017 | Rahman | G06F 40/295 |
| | | | 705/3 |
| 2018/0013662 A1* | 1/2018 | Salam | H04L 12/4641 |
| 2018/0107650 A1* | 4/2018 | Calvo | G06F 3/04883 |
| 2019/0114370 A1* | 4/2019 | Cerino | G06F 40/14 |
| 2020/0042939 A1 | 2/2020 | Padmanabhan | |
| 2020/0117856 A1* | 4/2020 | Kumar Karn | G06F 40/30 |
| 2020/0387675 A1 | 12/2020 | Nugent et al. | |
| 2021/0141993 A1* | 5/2021 | Han | G06F 40/30 |
| 2021/0149993 A1 | 5/2021 | Torres | |
| 2022/0093088 A1 | 3/2022 | Rangarajan Sridhar et al. | |
| 2022/0100963 A1 | 3/2022 | Anubhai et al. | |
| 2022/0129621 A1 | 4/2022 | Guda et al. | |
| 2022/0215184 A1* | 7/2022 | Freitag | G06F 40/226 |
| 2022/0261546 A1* | 8/2022 | Liu | G06F 40/16 |
| 2022/0301072 A1* | 9/2022 | Wang | G06F 40/279 |
| 2022/0365993 A1 | 11/2022 | Voisin et al. | |
| 2022/0391453 A1* | 12/2022 | Kewalramani | G06F 40/284 |
| 2023/0012316 A1* | 1/2023 | Mavinakuli | G06N 20/20 |
| 2023/0046851 A1* | 2/2023 | Ogura | G06F 40/289 |
| 2023/0056987 A1* | 2/2023 | Hunter | G06F 16/9038 |
| 2023/0059494 A1* | 2/2023 | Hunter | G06F 40/279 |
| 2023/0123574 A1* | 4/2023 | Guberman | G06N 20/20 |
| | | | 704/9 |

OTHER PUBLICATIONS

Classification Definitions Class 715, Data Processing: Presentation Processing of Document, Operator Interface Processing, and Screen Saver Display Processing; Feb. 2011; USPTO.gov, pp. 1-33.*

Joos Korstanje; SMOTE; Aug. 29, 2021; Towards Data Science; pp. 1-35.*

Custódio et al.; Stacked authorship attribution of digital texts; Mar. 13, 2021; Expert Systems with Applications; vol. 176; ISSN 0957-4174; Elsevier; pp. 1-13.*

Denk et al., "Contextual BERT: Conditioning the Language Model Using a Global State" arXiv:2010.15778v1 [cs.CL] Oct. 29, 2020.

International Search Report and Written Opinion in International Appln. No. PCT/US2023/084341, mailed on Apr. 23, 2024, 13 pages.

* cited by examiner

CONTEXT-BASED NATURAL LANGUAGE PROCESSING

BACKGROUND

The present disclosure relates to methods, systems, and apparatuses for training and applying natural language processing (NLP) models.

NLP models are used for, among various tasks, lexical analysis and semantic analysis of natural language texts. Training and applying NLP models require vast computational resources and time. Thus, computationally efficient NLP models are desirable for processing a large number of natural language texts.

SUMMARY

This specification describes data processing and techniques for training and applying natural language processing (NLP) models.

In an aspect, a computer-implemented method include obtaining, by one or more processors, a natural language document that includes multiple provisions. Each provision includes one or more texts belonging to a same class. The computer-implemented method includes accessing, by the one or more processors, a database that includes natural language processing (NLP) models. A first set of NLP models are configured to recognize a first provision. Each model in the first set of NLP models is configured to use contextual information of varying lengths of texts from the natural language document. A second set of NLP models are configured to recognize a second provision. Each model in the second set of NLP models is configured to use contextual information of varying lengths of texts from the natural language document. The computer-implemented method includes obtaining, by the one or more processors, a user input indicative of a set of provisions. For at least one given provision in the set of provisions, the computer-implemented method includes identifying, by the one or more processors and based on accessing the database, corresponding NLP models in the database. The corresponding NLP models are configured to recognize the provision in the natural language document. The computer-implemented method includes applying, by the one or more processors, a first NLP model in the corresponding NLP models to create a first annotated natural language document; inputting the first annotated natural language document to a second NLP model in the corresponding NLP models; and outputting, by the one or more processors, an output natural language document annotated with the set of provisions. Other embodiments of this aspect include corresponding systems, apparatus, and computer programs, configured to perform the actions of the methods, encoded on computer storage devices.

Embodiments can include one or any combination of two or more of the following features.

The natural language document includes a plurality of natural language texts. At least some of the natural language texts are structured data.

The computer-implemented method includes identifying, by the one or more processors, non-structured data in the plurality of natural language texts; converting, by the one or more processors, the non-structured data into standardized structured data; and storing, by the one or more processors, the standardized structured data in the database. The standardized structured data are provided to the NLP models.

The computer-implemented method includes, by the one or more processors, automatically providing the standardized structured data, as an input, to the NLP models.

Obtaining the user input indicative of the set of provisions includes presenting, by the one or more processors and on a user interface, a plurality of user selectable elements; and obtaining, by the one or more processors, a user selection of the plurality of user selectable elements. Each of the plurality of user selectable elements corresponds to a respective provision.

The first NLP model is trained to predict whether each n-gram of the natural language document corresponds to the provision. The second NLP model is trained to predict whether each 2n-gram of the natural language document corresponds to the provision. The n-gram is a sentence.

The computer-implemented method includes, in responsive to determining that a pre-defined threshold on accuracy of annotations generated by NLP models is not satisfied, applying, by the one or more processors, a second NLP model in the corresponding NLP models to create a second annotated natural language document; and inputting the second annotated natural language document to a third NLP model in the corresponding NLP models. The second annotated natural language document includes annotations by the first and the second NLP models.

Outputting an output natural language document annotated with the set of provisions includes enabling display of the output natural language document annotated with the set of provisions on a user interface.

The computer-implemented method includes, in response to determining that the first NLP model does not meet a F1 score threshold, retraining the first NLP model.

The computer-implemented method includes training at least one of the natural language processing (NLP) models. Training at least one of the NLP models includes obtaining, by the one or more processors, a plurality of training natural language documents. Each of the plurality of training natural language documents is annotated with one or more provisions and includes domain-specific corpus. Training at least one of the NLP models includes accessing, by the one or more processors, a pre-trained natural language processing (NLP) model. The pre-trained NLP model is trained to support text classification using a general corpus and includes a plurality of weights, each weight corresponding to a feature used in making a prediction. Training at least one of the NLP models includes identifying, by the one or more processors and for a given provision, a set of positive n-grams and a set of negative n-grams. The set of positive n-grams represents natural language texts that are provisions in the plurality of training natural language documents, and the set of negative n-grams represents natural language texts that are not provisions in the plurality of training natural language documents. Training a least one of the NLP models includes generating, by the one or more processors, one or more NLP models by fine-tuning the pre-trained NLP model with contextual information from the set of positive n-grams and the set of negative n-grams.

The pre-trained NLP model includes bidirectional encoder representations from transformers (BERT), robustly optimized BERT pre-training approach (ROBERTa), a distilled version of BERT (DistilBERT), and a long-document transformer (Longformer).

The computer-implemented method includes identifying natural language texts in each of the plurality of training natural language documents; and processing the natural language texts. Processing the natural language texts includes identifying that non-structured data in the natural language texts; converting the non-structured data into standardized structured data; and removing noise from the standardized structured data. The standardized structured data include a sequence of n-grams.

The computer-implemented method includes determining class imbalance based on the set of positive n-grams and the set of negative n-grams; generating, based on the set of positive n-grams, synthetic positive n-grams; and fine-tuning the pre-trained NLP model by using the synthetic positive n-grams, the set of positive n-grams, and the set of negative n-grams.

Other embodiments of this aspect include corresponding systems, devices, apparatus, and computer programs configured to perform the actions of the computer-implemented methods. The computer programs (e.g., instructions) can be encoded on computer storage devices.

Particular embodiments of the subject matter described in this specification can be implemented so as to realize one or more of the following advantages. First, applying NLP models that utilize varying contextual information, e.g., each model with different lengths of contextual information, enables efficient annotations of natural language documents. For example, a model that employs multiple sub-models that are trained to use unique length of contextual information can achieve higher accuracy, precision, and recall than a model that uses fixed contextual information. Second, the generated annotations reduces data transmissions among users by reducing laborious manual annotations and the back-and-forth review. For example, for the case of manual annotations, one may annotate a provision and ask others for approval; repeating this process for many provisions in many documents would result in excessive data transmissions. The graphical user interface described here saves data transmissions by effectively displaying recognized provisions and soliciting user feedback. Third, the approach of automatically identifying complexity of provisions, a class of texts to be annotated in natural language documents, allows computationally efficient processing. For example, when predicting for a rather simple provision, the system may utilize one NLP model, whereas the system may utilize multiple NLP models for more complex provisions. In the case of using multiple NLP models, the system embeds previously generated annotations for additional source of contextual information and generates robust annotations. Fourth, the usage of domain-specific corpus for fine-tuning pre-trained NLP models minimizes noise and maximizes semantic variations, by capturing representative texts found in domain-specific documents. For example, the pre-trained NLP model relying on a general corpus might not be accurate on predicting provisions in legal documents, where meanings of even the same words may differ. Fifth, processing the natural language documents, including text inference, noise removal, and data standardization, solves a technical challenge of applying NLP models to diverse documents including free-form texts, images, and scanned documents. Sixth, a user interface for training and applying NLP models enhances a user experience of providing inputs to NLP models and visualizing outputs.

An example system in which these techniques may be used is a provision identification system that processes large amount of natural language documents, and each provision has a varying complexity. However, any system that implements NLP in a low computing resource environment (e.g., a mobile device environment) can benefit from the techniques discussed herein.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

According to an aspect of the present disclosure, systems and methods for annotating a natural language document with one or more provisions are disclosed. As used throughout this specification, provisions are texts belonging to a same class, e.g., a set of sentences describing a particular sentiment (e.g., happy), a set of phrases about a particular contract provision (e.g., non-disclosure agreement), or a set of words describing a particular entity (e.g., New York City). In some implementations, provisions have varying complexities making it more difficult to identify more complex provisions relative to identifying less complex provisions. For example, a system that implements a natural language processing (NLP) model on a contract document may find that identifying sentences belonging to a first provision (e.g., non-disclosure agreement) may be more complex than identifying sentences belonging to a second provision (e.g., delay remedies). The second provision may be harder to be recognized than the first provision, because the second provision may be more lexically and semantically diverse and thus require more contextual information. Depending on relative complexity of a provision, the system invokes a number of (e.g., one or more) NLP models, each of which have been trained on different lengths of contextual information. For example, a first NLP model may utilize a length of two sentences as contextual information, and a second NLP model may utilize a length of a sentence as contextual information. In some implementations, the system may apply the first NLP model, after determining complexity of a provision. In some implementations, the system may apply the second NLP model, e.g., after determining that the provision requires higher resolution of contextual information. In some implementations, after applying the first NLP model, the system obtains performance metrics, such as accuracy and precision, and may further apply the second NLP model. In this instance, when applying the second NLP model, the system utilizes generated annotations by the first NLP model for an additional source of contextual information for robust predictions of a given provision.

Figure 1:
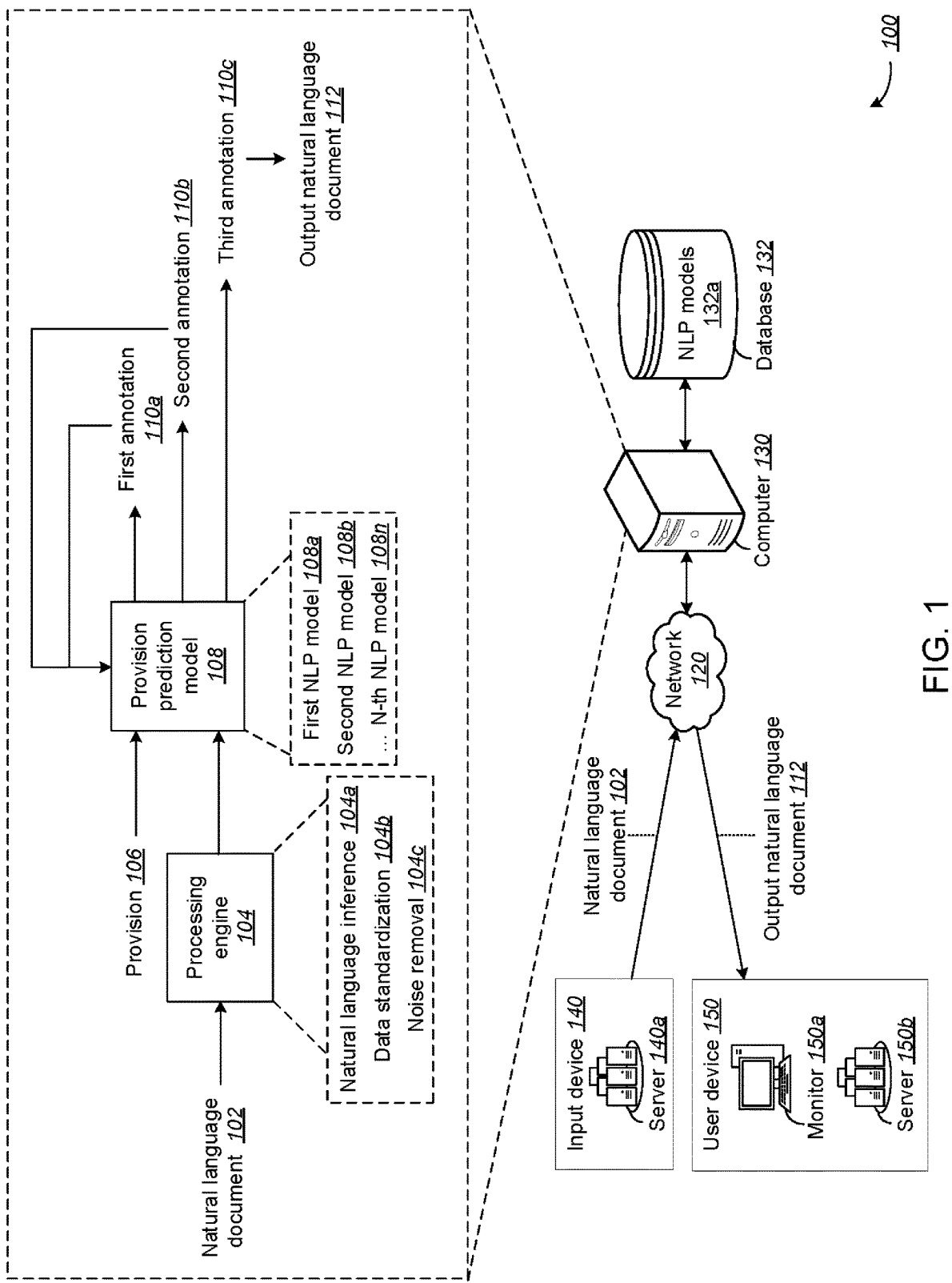
FIG. 1 is a block diagram of an example system for annotating a natural language document with one or more provisions.

FIG. 1 is a block diagram of an example system 100 that obtains a natural language document 102 and generates an output natural language document 112 that is annotated with one or more provisions. The system 100 includes an input device 140, a network 120, and one or more computers 130 (e.g., one or more local or cloud-based processors, or servers). The computer 130 can include a processing engine 104 and a provision prediction model 108. For purposes of the present disclosure, an "engine" can include one or more software modules, one or more hardware modules (e.g., one or more processors, data processing apparatus, computers, servers, or other appropriate hardware), or a combination of one or more software modules and one or more hardware modules. In some implementations, one or more computers are dedicated to a particular engine. In some implementations, multiple engines can be installed and running on the same computer or computers.

The input device 140 is a device that is configured to obtain the natural language document 102, a device that is configured to provide the natural language document 102 to another device across the network 120, or any suitable combination thereof. For example, the input device 140 can include a server 140a that is configured to obtain the natural language document 102, e.g., a contract document, an insurance policy, an essay, a textbook. The natural language document 102 need not be limited to these examples. In some implementations, the natural language document 102 is a scanned document. In some implementations, the natural language document 102 includes figures. In some implementations, the server 140a can obtain the natural language document 102 by accessing a database 132 that includes documents by a user. In some implementations, the server 140a can obtain the natural language document 102 by presenting a user interface that prompts a user to upload a document from a computing device such as computer (e.g., desktop, laptop, tablet, etc.), a smartphone, or a server. In such instances, the one or more other input devices can be used to access the natural language document 102 obtained by the server 140a and transmitted to the computer 130 via the network 120. The network 120 can include one or more of a wired Ethernet network, a wired optical network, a wireless WiFi network, a LAN, a WAN, a Bluetooth network, a cellular network, the Internet, or other suitable network, or any combination thereof. In some implementations, the server 140a and the computer 130 are the same.

The computer 130 is configured to obtain the natural language document 102 from the input device 140 such as the server 140a. In some implementations, the natural language document 102 can be data received over the network 120. In some implementations, the computer 130 can store the natural language document 102 in the database 132. The database 132, such as a local database or a cloud-based database, can store trained NLP models 132a. The computer 130 can access the database 132 and retrieve a particular NLP model by its identifier among NLP models 132a stored in the database 132.

The processing engine 104 is configured to obtain the natural language document 102 and generate processed natural language document for input to the provision prediction model 108. The processing engine 104 can perform preprocessing on the natural language document 102, e.g., one or more of natural language inference 104a, data standardization 104b, noise removal 104c, or other data processing. The processed natural language document generated by the processing engine 104 can be represented by a data structure, e.g., a sequence of tuples, indicative of n-grams in the natural language document 102. For example, the processing engine 104 obtains a scanned document as an input, recognizes texts from the scanned document, removes non-texts from the scanned document, and standardizes texts into structured data such as a sequence of tuples. From the standardized texts, the processing engine 104 generates a list of n-grams, which are units of texts such as one or more sequences, clauses, or words. For example, the processing engine 104 converts the texts into a list of sentences, to which the provision prediction model 108 will apply a NLP model, thereby generating a prediction on each of the sentences as to whether it belongs to a particular provision. In some implementations, the processing engine 104 receives multiple natural language documents and process them in parallel. In some implementations, the provision prediction model 108 obtains the natural language document 102 directly.

The provision prediction model 108 is configured to receive the processed natural language document, recognize a provision, and generate an annotation based on the recognized provision. The provision prediction model 108 can select and configure algorithms and includes a set of NLP models, including first NLP model 108a, second NLP model 108b, . . . , and N-th NLP model 108n. Each of the NLP models is a model outputted from training a machine, e.g., the computer 130, to perform provision prediction; training is described in more detail referring to FIG. 2 below. In some implementations, each of the NLP models is trained to recognize a particular provision. In some implementations, some of the NLP models are trained to recognize multiple provisions. In some implementations, there are multiple NLP models recognizing the same provision but by using different contextual information.

For example, as an output of applying the first NLP model 108a to the processed natural language document, the provision prediction model 108 generates a first annotation 110a. The first annotation 110a indicates a portion of the texts, in the natural language document 102, predicted to correspond to the provision. The provision prediction model 108 applies the second NLP model 108b to the processed natural language document embedded with the first annotation 110a. In other words, the output of the first NLP model is input to the second NLP model so that the second NLP model can use the annotations created by the first NLP model as context to inform the predictions of the second NLP model. Similarly, the output of each NLP model trained for a specific provision can be input to a subsequent NLP model that has been trained for that specific provision so that each subsequent prediction phase can utilize the prior predictions of other NLP models as context for the present prediction.

In some implementations, the second NLP model 108b utilizes n-grams as contextual information, whereas the first NLP model 108a utilizes 2n-grams as contextual information. The second NLP model 108b generates a second annotation 110b, which is provided as an input to the next NLP model. The provision prediction model 108 performs this provision prediction in an iterative manner until a condition is met, e.g., until all NLP models for a given provision are exhausted, an acceptable performance is achieved, or a user preference is met. The provision prediction model 108 provides an output natural language document 112 that incorporates the latest annotation generated, e.g., a third annotation 110c. The third annotation 110c incorporates contextual information from both the first annotation 110a and the second annotation 110b, as well as contextual information from corresponding NLP models. In some implementations, the generated annotations are stored in the database 132, e.g., as metadata.

The computer 130 can generate rendering data that, when rendered by a device having a display such as a user device 150 (e.g., a computer having a monitor 150a, a mobile computing device such as a smart phone 150b, or another suitable user device), can cause the device to output data including the output natural language document 112. Such rendering data can be transmitted, by the computer 130, to the user device 150 through the network 120 and processed by the user device 150 or associated processor to generate output data for display on the user device 150. In some implementations, the user device 150 can be coupled to the computer 130. In such instances, the rendered data can be processed by the computer 130, and cause the computer 130, on a user interface, to output data such as the output natural language document 112. The user interface is described in more detail referring to FIG. 3 below.

Figure 2:
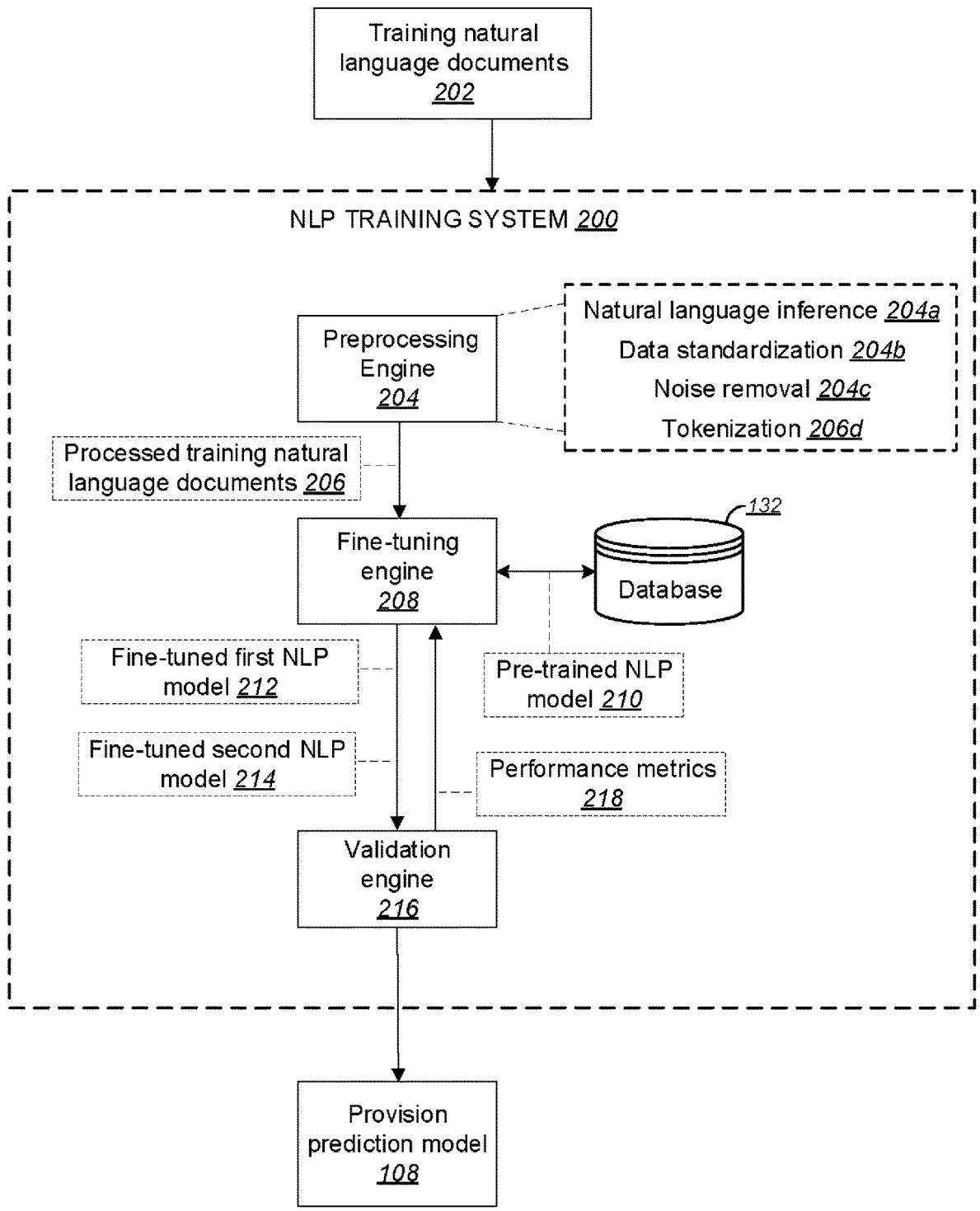
FIG. 2 is a block diagram of an example system for training a natural language processing (NLP) model configured to recognize a provision.

FIG. 2 is a block diagram of an example NLP training system 200 for training a provision prediction model 108. The NLP training system 200 obtains training natural language documents 202 and processes the training natural language documents 202. The training natural language documents 202 are annotated with one or more provisions, e.g., by experts.

The NLP training system 200 includes a preprocessing engine 204, a fine-tuning engine 208, and a validation engine 216. The preprocessing engine 204 performs one or more processing of the training natural language documents and generates processed training natural language documents 206. Processing includes, for example, natural language inference 204a (inferring texts from figures or scanned documents), data standardization 204b (converting non-structured data to standardized, structured data), noise removal 204c (removing noise such as non-text or non-essential information in the documents), and tokenization 206d (tokenizing the texts). In some implementations, the NLP training system 200 processes the training natural language documents 202, using the processing engine 104 as described referring to FIG. 1.

The fine-tuning engine 208 obtains the processed training natural language documents 206 and generates a fine-tuned NLP model by fine-tuning a pre-trained NLP model 210. The fine-tuning engine 208 accesses the database 132, where the pre-trained NLP models are stored, and obtains a pre-trained NLP model. The pre-trained NLP model is trained to support text classification. The text classification, also referred to as a sequence classification, classifies texts, e.g., sentences, based on a general corpus. The fine-tuning engine identifies, from the processed training natural language documents 206, a set of positive n-grams and a set of negative n-grams. The n-gram is a unit of text that can be determined by the fine-tuning engine 208 or can be specified by a user. In some implementations, each n-gram is a sentence. In some implementations, each n-gram is a clause having a specified length. For example, the fine-tuning engine 208 determines that texts belonging to a given provision are the set of positive n-grams, and remaining texts as the set of negative n-grams. In some implementations, the fine-tuning engine 208 samples the set of texts belonging to a given provision as the set of positive n-grams, and accordingly samples the set of texts not belonging to a given provision as the set of negative n-grams. The fine-tuning engine 208 generates a fine-tuned first NLP model 212 by fine-tuning the pre-trained NLP model 210 with contextual information from the set of positive n-grams and the set of negative n-grams.

The validation engine 216 obtains the fine-tuned first NLP model 212 and outputs one or more performance metrics 218. The performance metrics 218 include accuracy, precision, recall, F1 score, or other suitable quantitative metrics. The validation engine 216 generates the performance metrics 218 by evaluating the fine-tuned first NLP model's performance on held-out data, e.g., a portion of training data being held for validation, or independent testing data. The validation engine 216, in some implementations, provides the performance metrics 218 to the fine-tuning engine 208, upon determining that the performance by the fine-tuned first NLP model 212 does not meet a pre-defined performance threshold. Either the system or the user can set the performance threshold.

The fine-tuning engine 208 obtains the performance metrics 218 generated by the validation engine 216 and generates a fine-tuned second NLP model 214. To generate the second NLP model 214, the fine-tuning engine 208 utilizes contextual information of varying lengths. For example, if the fine-tuning engine 208 used the 2n-grams in training the first NLP model, e.g., to save computational time in generating a model (because using 2n-grams would result in less training data and faster predictions than using n-grams), the fine-tuning engine 208 may use the n-grams in training the second NLP model. This training strategy is advantageous in achieving an acceptable performance while reducing computational burdens; a user may initiate the training with the bigger units (e.g., 5n-grams) and determine the next training parameters based on the performance metrics. In some implementations, if the first model satisfies the performance threshold, the validation engine 216 may output the first model, without providing the performance metrics 218 to the fine-tuning engine 208. The generated NLP models are provided to the provision prediction model 108.

In some implementations, the fine-tuning engine 208 may determine the size of n-grams without relying on the performance metrics 218. For example, the fine-tuning engine 208 can determine complexity of a given provision, e.g., by computing average length of the texts, median number of unique words in the provision, and the like. Based on the complexity of the provision, the fine-tuning engine 208 can identify the size of n-grams and generate positive and negative n-grams to be used in fine-tuning the pre-trained NLP model.

Figure 3:
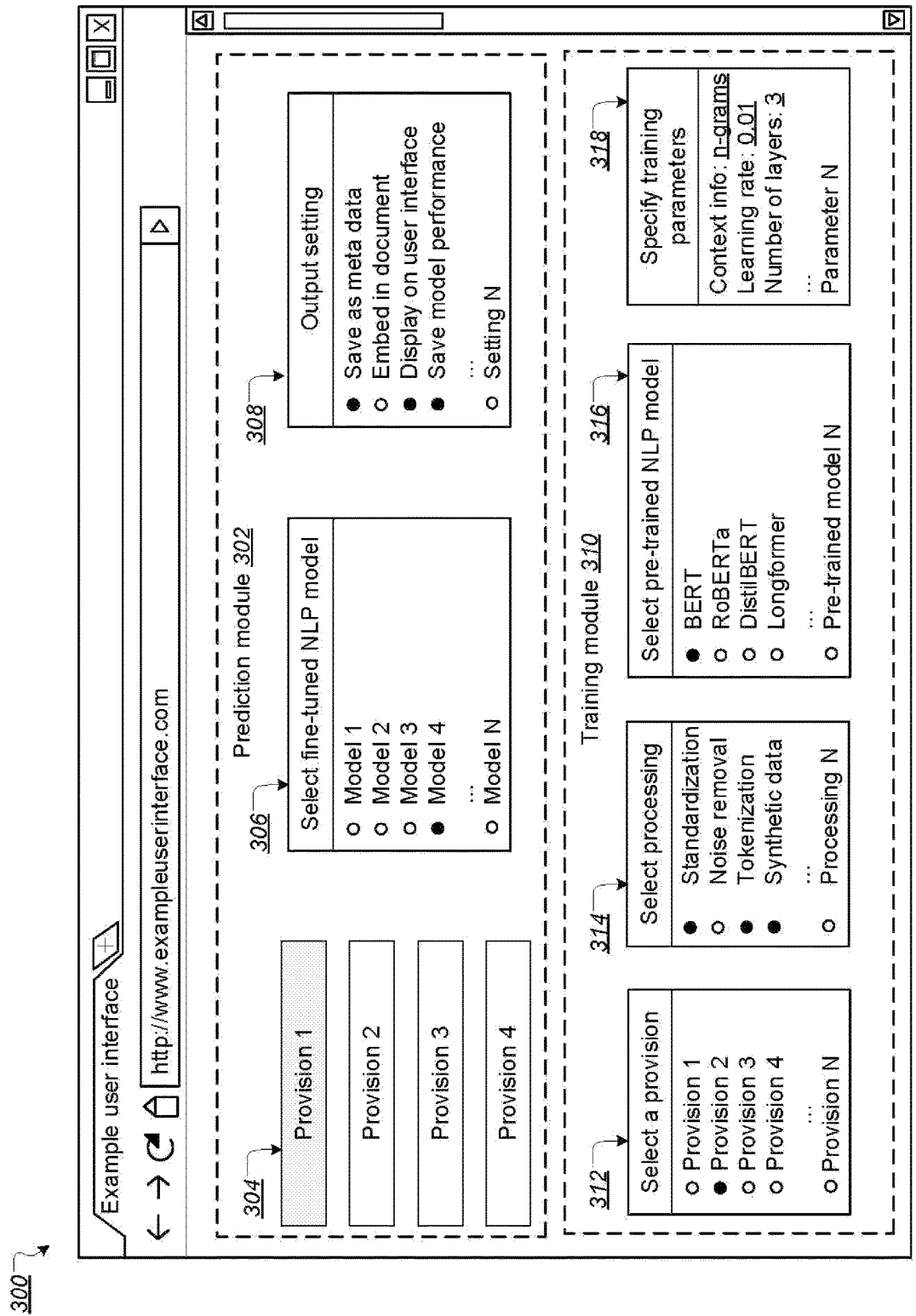
FIG. 3 illustrates an example user interface for training and applying NLP models.

FIG. 3 shows an example user interface 300 for training and applying NLP models. In some implementations, the user interface 300 displays the output natural language document annotated with provisions. In the example of FIG. 3, the user interface 300 is a web-based user interface displayed on the user device 150. The user interface 300 includes two modules: a prediction module 302 and a training module 310.

The prediction module 302 allows a user to apply NLP models to a natural language document. In some implementations, the user uploads the natural language document by interacting with the prediction module 302. The prediction module includes a provision panel 304 that obtains a user input indicative of the set of provisions to be annotated to the natural language document. Each user selectable element in the provision panel 304 corresponds to a respective provision. For example, the user can select a first provision ("Provision 1"). The user can select multiple provisions in the provision panel 304.

The prediction module includes a model selection panel 306 that obtains a user input indicative of NLP models to be applied to the natural language document. In some implementations, the user interface 300 displays historical performance of each models to the user for a given provision. In some implementations, the user interface 300 alerts a user that multiple models should be used for a selected provision to meet a predefined accuracy.

The prediction module includes an output setting panel 308 that obtains user preferences. For example, the user can indicate to save annotations as meta data, separate from the natural language document, or to embed annotations in the natural language document. The user can indicate whether to display the annotated natural language document on the user interface. The user can indicate to save model performance, e.g., precision, recall, F1 score, and accuracy. In some implementations, the system implementing the NLP model computes the model performance by holding out a subset of the natural language document for testing the NLP model against the held-out data.

Responsive to the user's selections in the prediction module 302, the user interface 300 enables applying the selected NLP model(s) to the natural language document. Based on the model performance, the user can apply a second NLP model on a first annotated natural language document. That is, the second NLP model uses the annotation generated by the first NLP model as contextual information in recognizing the selected provision. Leveraging contextual information through applying multiple NLP model not only increases prediction accuracy, but also saves computational resources by reducing the need to retrain the first NLP model.

In some implementations, the user interface 300 accepts a user feedback on the output natural language document. For example, the user interface 300 displays the output natural language document with each provision annotated by a different color. The user provides feedback data, e.g., by highlighting a portion of texts incorrectly annotated or by indicating a portion of texts that should have been annotated. In response to obtaining the feedback data, the system further fine-tunes the NLP model, e.g., by using the feedback data as additional training data. The user may retrain the NLP model by interacting with the training module 310.

The training module 310 allows the user to train NLP models by using training natural language documents. The training natural language documents are annotated with one or more provisions and include domain-specific corpus. The domain-specific corpus is different from a general corpus in that the training natural language documents include texts found in a given domain. For example, for an application in recognizing provisions in contract documents, training natural language documents include contract terms such as delay remedies, audit rights, and design responsibility. Because the general corpus lacks this domain-specific corpus, the system fine-tunes a pre-trained NLP model with the domain-specific corpus. In some implementations, the user uploads the training natural language document by interacting with the training module 310. In some implementations, the system uses historical natural language documents, e.g., those uploaded by the user, for training.

The training module 310 includes a selection panel 312, a processing panel 314, a model architecture panel 316, and a training parameter panel 318. The selection panel 312 obtains a user input indicative of a provision to be trained for. The processing panel 314 obtains a user input for a set of processing, such as data standardization, natural language identification, noise removal, tokenization, synthetic data generation, to be applied to the training natural language documents, e.g., as described in referring to the processing engine 104 in FIG. 1. The model architecture panel 316 obtains a user input indicative of a pre-trained NLP model. The pre-trained NLP model includes bidirectional encoder representations from transformers (BERT), robustly optimized BERT pre-training approach (ROBERTa), a distilled version of BERT (DistilBERT), and a long-document transformer (Longformer). These pre-trained NLP models have different underlying architectures and are trained on a general corpus (thus not fine-tuned for a particular application). The training parameter panel 318 allows the user to specify training parameters including contextual information, a learning rate, a number of layers of neural networks, a batch size, a training/validation split ratio, and the like. For example, in responsive to the user's specification of the contextual information as n-grams (e.g., a sentence), the system identifies a set of positive n-grams and a set of negative n-grams. The positive n-grams correspond to texts corresponding to a given provision among the training natural language documents, while the negative n-grams correspond to other texts not belonging to the positive n-grams. Consequently, the fine-tuned NLP model is configured to make a prediction in a resolution of each n-gram.

Responsive to the user's selections in the training module 310, the user interface 300 enables training the NLP model by using the training natural language documents for the selected provision. Based on the model performance and/or the complexity of the provision, the user may train a second NLP model by varying any of the settings in the training module 310. For example, the second NLP model may utilize different contextual information, e.g., 2n-grams (e.g., two sentences). The second NLP model that utilizes the 2n-grams as contextual information makes a prediction in a resolution of each 2n-grams. This training strategy varying lengths of contextual information is advantageous in achieving an acceptable level of performance in a computationally efficient manner. This is because each provision has a varying complexity (e.g., a first provision of delay remedies more complex than a second provision of non-disclosure agreement) and varying training data (e.g., ample training documents that include the first provision, while having only a few training documents that include the second provision). For a rather complex provision, multiple models, each utilizing different contextual information, may be used to meet an acceptable performance metric, e.g., a certain F1 score. In some implementations, the user may define the acceptable performance metric in the training module 310. For example, the user may indicate that accuracy of 80% and precision of 80% are acceptable for the first provision, while indicating accuracy of 70% and precision of 50% are acceptable for the second provision.

Figure 4:
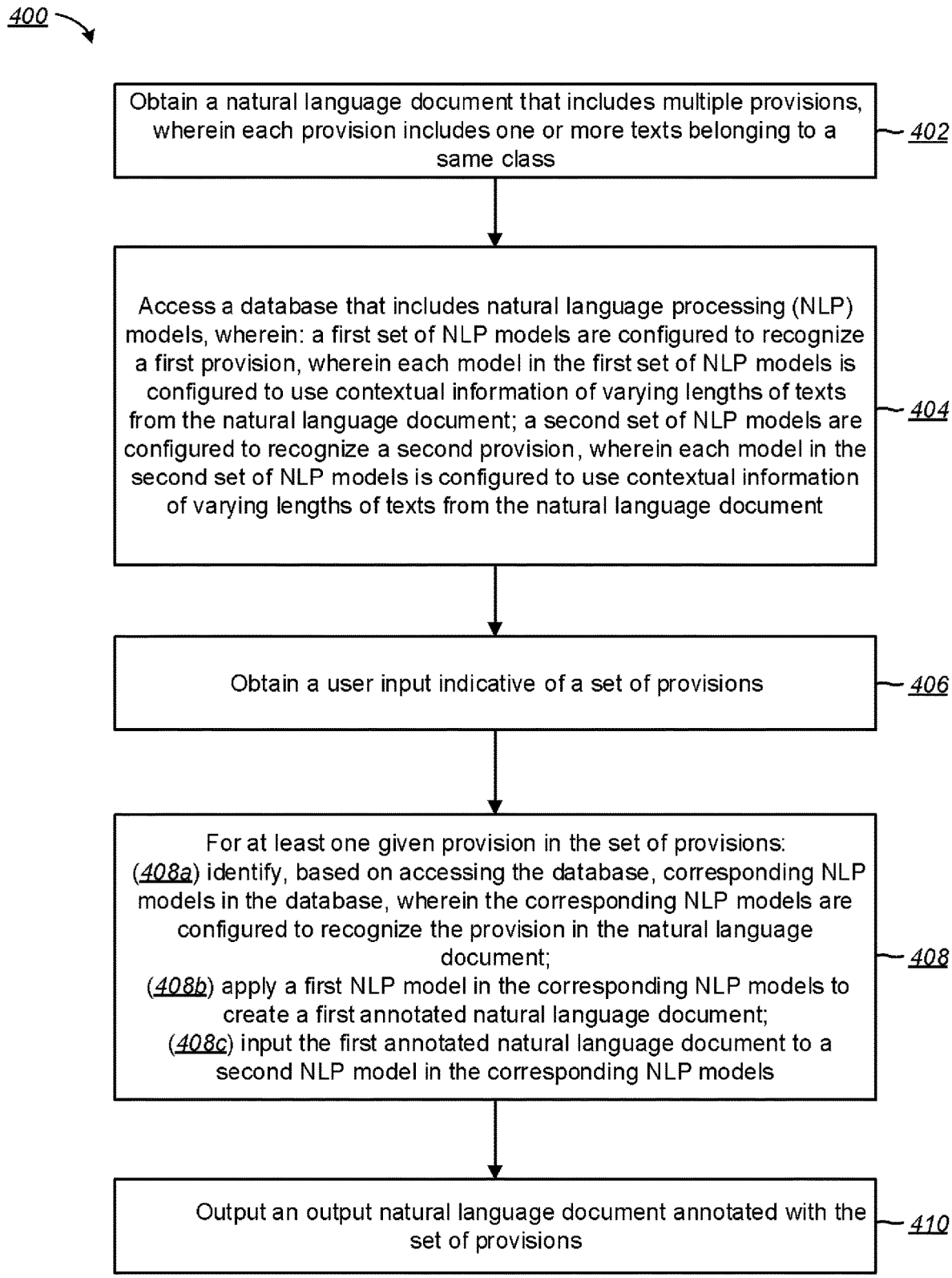
FIG. 4 is a flowchart of example process for annotating a natural language document.

FIG. 4 is a flowchart of an example of a process 400 for annotating a natural language document. The process will be described as being performed by a system of one or more computers programmed appropriately in accordance with this specification. For example, the computer 130 of FIG. 1 can perform at least a portion of the example process. In some implementations, various steps of the process 400 can be run in parallel, in combination, in loops, or in any order.

The system obtains a natural language document (402). The natural language document includes multiple provisions. Each provision includes one or more natural language texts (or simply referred to as texts) belonging to a same class. For example, the natural language document is a contract document that includes various provisions from non-disclosure agreement to delay remedies. Texts in a given provision are considered to belong to a same class.

In some implementations, the natural language document includes unstructured data, e.g., sentences as typed by a user. In some implementations, the system identifies non-structured data in a plurality of texts in the natural language document, converts the non-structured data into standardized structured data, and stores the standardized structured data in the database, e.g., the database 132. The standardized, structured data, for example, are represented by a matrix of tuples, each tuple including a sequence of elements in a respective text. In some implementations, the system automatically provides the standardized structured data, as an input, to the NLP models.

The system accesses a database that includes natural language processing (NLP) models (404). For example, the system accesses the database 132 with a reference identifying a given NLP model among a plurality of trained NLP models. Each of the NLP models are trained to recognize a particular provision. That is, a first set of NLP models are configured to recognize a first provision, and each model in the first set of NLP models is configured to use contextual information of varying lengths from the natural language document. For example, while a particular model recognizes a provision (e.g., non-disclosure agreement) in a resolution of a sentence, another model recognizes the same provision in a resolution of two sentences. Similarly, a second set of NLP models are configured to recognize a second provision, and each model in the second set of NLP models is configured to use contextual information of varying lengths of texts from the natural language document. In some implementations, for a given provision, there is a single trained NLP model.

The system obtains a user input indicative of a set of provisions (406). In some implementations, the system presents, on a user interface, a plurality of user selectable elements, as shown in FIG. 3. Each of the plurality of user selectable elements corresponds to a respective provision. The system obtains a user selection of the plurality of user selectable elements. In some implementations, the system applies a default rule on the set of provisions, e.g., recognizing the most frequently predicted provision by the user.

For at least one given provision in the set of provisions, the system applies sub-processes 408*a*-480*c*. The system identifies, based on accessing the database, corresponding NLP models in the database (408*a*). The corresponding NLP models are configured to recognize the provision in the natural language document. Continuing with the example of a contract document, the system identifies a set of NLP models that recognize, for example, a non-disclosure agreement, where each of the set of NLP models utilize different contextual information to identify the non-disclosure agreement. More specifically, the system applies a first NLP model in the corresponding NLP models to create a first annotated natural language document. The first annotated natural language document includes provisions predicted by the first NLP model. These provisions are consistent with the length of contextual information the first NLP is trained under. For example, the system applies a first NLP model that utilizes 3-sentence as contextual information and generates predictions in a resolution of 3-sentence. The system inputs the first annotated natural language document to a second NLP model in the corresponding NLP models (408*c*). For example, the system applies a second NLP model that utilizes 2-sentence as contextual information and generates prediction in a resolution of 2-sentence. When applying the second NLP model, the system utilizes the first annotation (e.g., 3-sentence predictions made by the first NLP model). The first annotation is the prediction outputted from the first NLP model and is an input for the second NLP model. In some implementations, the system iteratively applies NLP models until a condition is met, e.g., an acceptable performance metric. For example, the second NLP model uses the first annotation to generate the second annotation, where the second NLP model uses different contextual information compared to the first NLP model. As yet another example, N-th NLP model utilizes annotations generated by previous models along with texts the N-th NLP model is making predictions on. That is, the third NLP model (N-th model) uses the texts and both the annotation from the first model (N–2-th model) and the second model (N–1-th model).

In some implementations, in responsive to determining that a pre-defined threshold on accuracy of annotations generated by NLP models is not satisfied, the system applies a second NLP model in the corresponding NLP models to create a second annotated natural language document. The second annotated natural language document includes annotations by the first and the second NLP models. In some implementations, the system inputs the second annotated natural language document to a third NLP model in the corresponding NLP models and repeats the above iterative process of applying a model, annotating the natural language document, and inputting the annotated document to the next model, until the condition is met. In some implementations, the system retrains any one of the NLP models, in response to determining that the model does not meet a F1 score threshold.

The system outputs an output natural language document (410). The output natural language document is annotated with the set of provisions. In some implementations, the system enables display of the output natural language document annotated with the set of provisions on a user interface. For example, the system annotates each provision by a different color on the natural language document. In some implementations, the system obtains feedback data from a user indicative of an acceptance or a rejection on the annotations.

In some implementations, the system trains at least one of the NLP models by obtaining a plurality of training natural language documents that are annotated with one or more provisions, accessing a pre-trained NLP model trained to support text classification, identifying positive and negative labels, and generating one or more NLP models by fine-tuning the pre-trained NLP model with the positive and negative labels. In some implementations, the pre-trained NLP model includes BERT, ROBERTa, DistilBERT, and Longformer. In some implementations, a set of positive n-grams and a set of negative n-grams are the positive and negative labels respectively.

In some implementations, the system identifies natural language texts in each of the plurality of training natural language documents and processes the natural language texts such as data standardization, natural language identification, noise removal, tokenization, synthetic data generation. For the data standardization, the system identifies non-structured data in the natural language texts and converts the non-structured data into standardized structured data. In some implementations, the standardized structured data includes a sequence of n-grams. For the natural language identification, the system identifies texts from the non-texts such as figures or scanned documents. For the noise removal, the system removes non-texts such as punctuations or non-essential texts such as page numbers, headers, and footers. For the tokenization, the system breaks each sentence into smaller units such as words. For the synthetic data generation, the system generates texts that reproduce statistical properties of provided natural language texts. In some implementations, the system determines class imbalance in the training natural language documents, generates synthetic positive n-grams, and fine-tunes the pre-trained NLP model by using the synthetic positive n-grams in addition to the set of positive n-grams and the set of negative n-grams.

Figure 5:
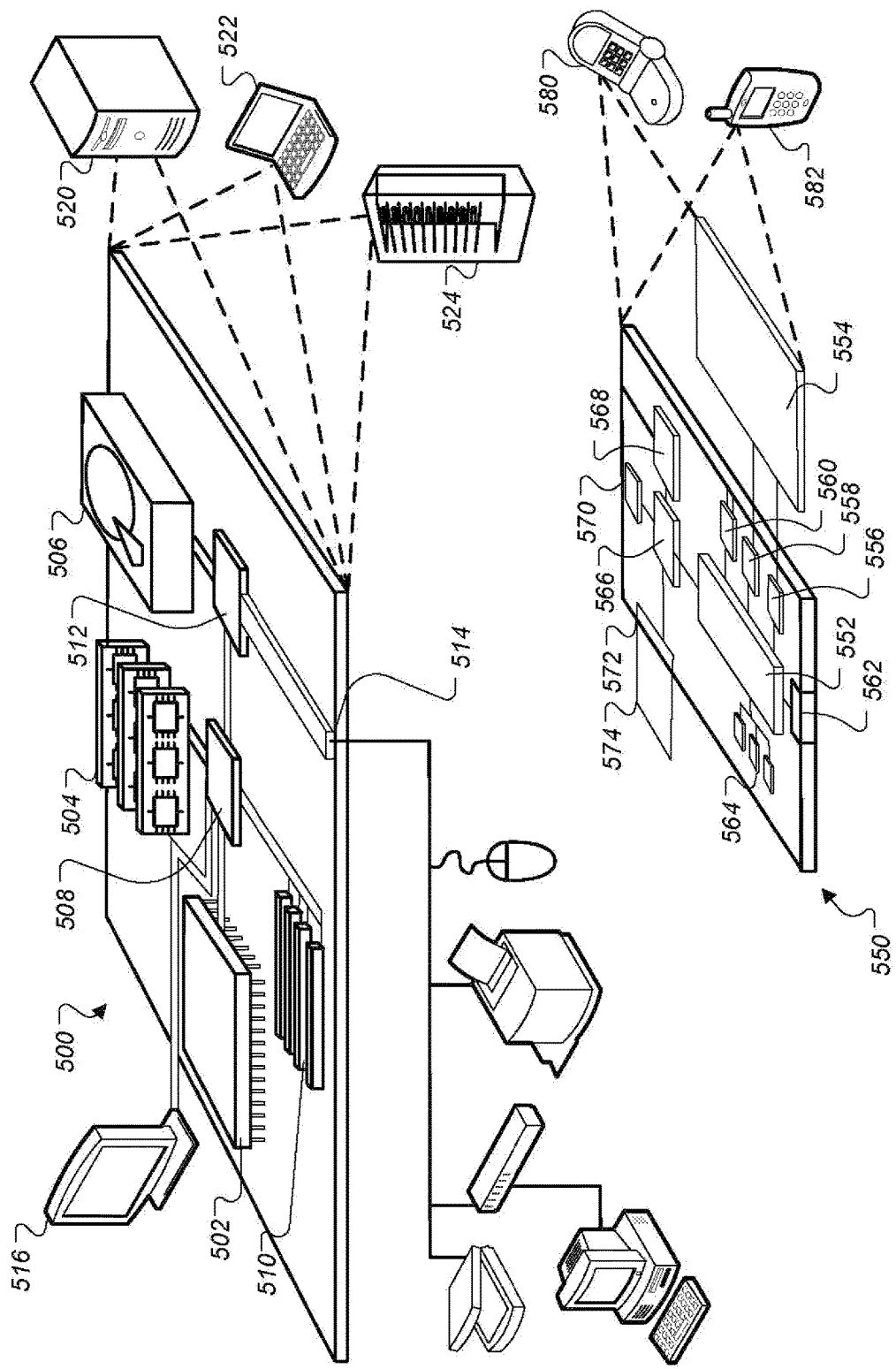
FIG. 5 is a block diagram of example system components that can be used to implement a system for training and applying NLP models.

FIG. 5 is an example of a block diagram of system components that can be used to implement a system for training and applying NLP models. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally, computing device 500 or 550 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high speed controller 508 connecting to memory 504 and high-speed expansion ports 510, and a low speed controller 512 connecting to low speed bus 514 and storage device 506. Each of the components 502, 504, 508, 508, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed controller 508. In other implementations, multiple processors and/or multiple buses can be used, as appropriate, along with multiple memories and types of memory. In addition, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 506 is capable of providing mass storage for the computing device 500. In one implementation, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high speed controller 508 is coupled to memory 504, display 516, e.g., through a graphics processor or accelerator, and to high-speed expansion ports 510, which can accept various expansion cards (not shown). In the implementation, low speed controller 512 is coupled to storage device 506 and low speed bus 514. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 500 can be implemented in a number of different forms. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

The computing device 500 can be implemented in a number of different forms. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes a processor 552, memory 564, and an input/output device such as a display 554, a communication interface 566, and a transceiver 568, among other components. The device 550 can also be provided with a storage device, such as a micro-drive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. Additionally, the processor can be implemented using any of a number of architectures. For example, the processor can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 550, such as control of user interfaces, applications run by device 550, and wireless communication by device 550.

Processor 552 can communicate with a user through control interface 558 and display interface 556 coupled to a display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single In Line Memory Module) card interface. The expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through (radio-frequency) transceiver 568. In addition, short-range communication can occur, such as using a Bluetooth, Wi-Fi, or other such transceiver (not shown). In addition, GPS (Global Positioning System) receiver module 570 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc. and can also include sound generated by applications operating on device 550.

The computing device 550 can be implemented in a number of different forms. For example, it can be implemented as a cellular telephone 580. It can also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the present disclosure. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A computer-implemented method comprising:
obtaining, by one or more processors, a natural language document that includes multiple provisions, wherein the natural language document is a legal document, each provision includes a set of words and corresponds to a particular type of legal clause from among a plurality of types of legal clauses in the natural language document;
accessing, by the one or more processors, a database that includes a plurality of sets of natural language processing (NLP) models, wherein each set of NLP models in the plurality of sets of NLP models is trained to predict a respective type of legal clause from among the plurality of types of legal clauses, wherein each NLP model in a respective set of NLP models is configured to use contextual information of varying lengths of texts from the natural language document;
obtaining, by the one or more processors, a user input indicative of a set of provisions, wherein the set of provisions comprises at least two different provisions;
for at least one provision in the set of provisions:
identifying, by the one or more processors and based on accessing the database, a particular set of NLP models from the plurality of sets of NLP models, the particular set of NLP models including a first NLP model and a second NLP model trained to recognize the provision in the natural language document;
generating, by the first NLP model from the particular set of NLP models, a first annotated natural language document comprising a first set of annotations, wherein the first NLP model is trained to generate the first set of annotations based on contextual information from the natural language document that is of a first length, wherein each annotation in the first set of annotations identifies a sequence of words in the natural language document that is predicted to correspond to the provision at a resolution corresponding to the first length;
providing the first annotated natural language document generated by the first NLP model as an input to the second NLP model, wherein the second NLP model is trained to generate a second set of annotations for the first annotated natural language document based on the first set of annotations and contextual information from the natural language document that is of a second length different than the first length; and
generating, by the second NLP model, an output natural language document comprising the second set of annotations, wherein each annotation in the second set of annotations identifies a sequence of words in the natural language document that is predicted to correspond to the provision at a resolution corresponding to the second length; and
outputting, by the one or more processors, the output natural language document annotated with the second set of annotations for the at least one provision in the set of provisions.

2. The computer-implemented method of claim 1, wherein the natural language document comprises a plurality of natural language texts, wherein at least some of the natural language texts are structured data.

3. The computer-implemented method of claim 2, further comprising:
identifying, by the one or more processors, non-structured data in the plurality of natural language texts;
converting, by the one or more processors, the non-structured data into standardized structured data; and
storing, by the one or more processors, the standardized structured data in the database, wherein the standardized structured data are provided to the NLP models.

4. The computer-implemented method of claim 3, further comprising:
by the one or more processors, automatically providing the standardized structured data, as an input, to the NLP models.

5. The computer-implemented method of claim 1, wherein obtaining the user input indicative of the set of provisions comprises:
presenting, by the one or more processors and on a user interface, a plurality of user selectable elements, wherein each of the plurality of user selectable elements corresponds to a respective provision; and
obtaining, by the one or more processors, a user selection of the plurality of user selectable elements.

6. The computer-implemented method of claim 1, wherein:
the first NLP model is trained to predict whether each n-gram of the natural language document corresponds to the provision, and the second NLP model is trained to predict whether each 2n-gram of the natural language document corresponds to the provision, wherein a n-gram is a sentence of the natural language document, and wherein a 2n-gram is two sentences of the natural language document.

7. The computer-implemented method of claim 1, further comprising:
in response to determining that a pre-defined threshold on accuracy of annotations generated by one of (i) the first NLP and (ii) the second NLP model is not satisfied, providing an intermediate annotated document that is one of (i) the first annotated natural language document and (ii) the output natural language document, to a third NLP model in the particular NLP models, wherein the third NLP model is trained to generate a third set of annotations based on contextual information that is of a third length; and
generating, by the third NLP model, a second output annotated natural language document comprising the third set of annotations, wherein each annotation in the third set of annotations identifies a sequence of words in the natural language document that is predicted to correspond to the provision at a resolution corresponding to the third length different than the first length and the second length.

8. The computer-implemented method of claim 7, wherein:
in response to determining that the pre-defined threshold of the accuracy of the first NLP model is not satisfied, the intermediate annotated document provided to the third NLP model is the first annotated natural language document; or
in response to determining that the pre-defined threshold of the accuracy of the second NLP model is not satisfied, the intermediate annotated document provided to the third NLP model is the output natural language document.

9. The computer-implemented method of claim 1, wherein outputting an output natural language document annotated with the set of provisions comprises:
enabling display of the output natural language document annotated with the set of provisions on a user interface.

10. The computer-implemented method of claim 1, further comprising:
  determining, based on performance metrics of the first NLP model, a performance score for the first NLP model; and
  in response to determining that the first NLP model is below a performance score threshold, retraining the first NLP model.

11. The computer-implemented method of claim 1, further comprising:
  training at least one of the natural language processing (NLP) models, the training comprising:
    obtaining, by the one or more processors, a plurality of training natural language documents, wherein each of the plurality of training natural language documents is annotated with one or more provisions and includes domain-specific corpus;
    accessing, by the one or more processors, a pre-trained natural language processing (NLP) model, where the pre-trained NLP model is trained to support text classification using a general corpus and includes a plurality of weights, each weight corresponding to a feature used in making a prediction;
    identifying, by the one or more processors and for a given provision, a set of positive n-grams and a set of negative n-grams, wherein the set of positive n-grams represents natural language texts that are provisions in the plurality of training natural language documents, and the set of negative n-grams represents natural language texts that are not provisions in the plurality of training natural language documents; and
    generating, by the one or more processors, one or more NLP models by fine-tuning the pre-trained NLP model with contextual information from the set of positive n-grams and the set of negative n-grams.

12. The computer-implemented method of claim 11, wherein the pre-trained NLP model comprises bidirectional encoder representations from transformers (BERT), robustly optimized BERT pre-training approach (ROBERTa), a distilled version of BERT (DistilBERT), and a long-document transformer (Longformer).

13. The computer-implemented method of claim 11, further comprising:
  identifying natural language texts in each of the plurality of training natural language documents; and
  processing the natural language texts, wherein processing the natural language texts comprises:
    identifying that non-structured data in the natural language texts;
    converting the non-structured data into standardized structured data, wherein the standardized structured data include a sequence of n-grams; and
    removing noise from the standardized structured data.

14. The computer-implemented method of claim 11, further comprising:
  determining class imbalance based on the set of positive n-grams and the set of negative n-grams;
  generating, based on the set of positive n-grams, synthetic positive n-grams; and
  fine-tuning the pre-trained NLP model by using the synthetic positive n-grams, the set of positive n-grams, and the set of negative n-grams.

15. The computer-implemented method of claim 1, wherein each of the at least two different provisions corresponding to a respective type of legal clause from the plurality of types of legal clauses.

16. The computer-implemented method of claim 1, wherein each NLP model in a respective set of NLP models uses contextual information in the natural language document of a different length compared to another NLP model in the respective set of NLP models.

17. A system comprising:
  one or more processors and one or more storage devices storing instructions that are operable, when executed by the one or more processors, to cause the one or more processors to perform operations comprising:
    obtaining, by the one or more processors, a natural language document that includes multiple provisions, wherein the natural language document is a legal document, each provision a set of words and corresponds to a particular type of legal clause from among a plurality of types of legal clauses in the natural language document;
    accessing, by the one or more processors, a database that includes a plurality of sets of natural language processing (NLP) models, wherein each set of NLP models in the plurality of sets of NLP models is trained to predict a respective type of legal clause from among the plurality of types of legal clauses, wherein each NLP model in a respective set of NLP models is configured to use contextual information of varying lengths of texts from the natural language document;
    obtaining, by the one or more processors, a user input indicative of a set of provisions, wherein the set of provisions comprises at least two different provisions;
    for at least one provision in the set of provisions:
      identifying, by the one or more processors and based on accessing the database, a particular set of NLP models from the plurality of sets of NLP models, the particular set of NLP models including a first NLP model and a second NLP model trained to recognize the provision in the natural language document;
      generating, by first NLP model from the particular set of models, a first annotated natural language document comprising a first set of annotations, wherein the first NLP model is trained to generate the first set of annotations based on contextual information from the natural language document that is of a first length, wherein each annotation in the first set of annotations identifies a sequence of words in the natural language document that is predicted to correspond to the provision at a resolution corresponding to the first length;
      providing the first annotated natural language document generated by the first NLP model as an input to the second NLP model, wherein the second NLP model is trained to generate a second set of annotations for the first annotated natural language document based on the first set of annotations and contextual information from the natural language document that is of a second length different than the first length;
      generating, by the second NLP model, an output natural language document comprising the second set of annotations, wherein each annotation in the second set of annotations identifies a sequence of words in the natural language document that is predicted to correspond to the provision at a resolution corresponding to the second length; and
    outputting, by the one or more processors, the output natural language document annotated with the second set of annotations for the at least one provision in the set of provisions.

18. The system of claim 17, further comprising:
training at least one of the natural language processing (NLP) models, the training comprising:
obtaining, by the one or more processors, a plurality of training natural language documents, wherein each of the plurality of training natural language documents is annotated with one or more provisions and includes domain-specific corpus;
accessing, by the one or more processors, a pre-trained natural language processing (NLP) model, where the pre-trained NLP model is trained to support text classification using a general corpus and includes a plurality of weights, each weight corresponding to a feature used in making a prediction;
identifying, by the one or more processors and for a given provision, a set of positive n-grams and a set of negative n-grams, wherein the set of positive n-grams represents natural language texts that are provisions in the plurality of training natural language documents, and the set of negative n-grams represents natural language texts that are not provisions in the plurality of training natural language documents; and
generating, by the one or more processors, one or more NLP models by fine-tuning the pre-trained NLP model with contextual information from the set of positive n-grams and the set of negative n-grams.

19. A non-transitory computer-readable medium, comprising software instructions, that when executed by a computer, cause the computer to execute operations comprising:
one or more processors and one or more storage devices storing instructions that are operable, when executed by the one or more processors, to cause the one or more processors to perform operations comprising:
obtaining, by the one or more processors, a natural language document that includes multiple provisions, wherein the natural language document is a legal document, each provision includes a set of words and corresponds to a particular type of legal clause from among a plurality of types of legal clauses in the natural language document;
accessing, by the one or more processors, a database that includes a plurality of sets of natural language processing (NLP) models, wherein each set of NLP models in the plurality of sets of NLP models is trained to predict a respective type of legal clause from among the plurality of types of legal clauses, wherein each NLP model in a respective set of NLP models is configured to use contextual information of varying lengths of texts from the natural language document;
obtaining, by the one or more processors, a user input indicative of a set of provisions, wherein the set of provisions comprises at least two different provisions;
for at least one provision in the set of provisions:
identifying, by the one or more processors and based on accessing the database, a particular set of NLP models from the plurality of sets of NLP models, the particular set of NLP models including a first NLP model and a second NLP model trained to recognize the provision in the natural language document;
generating, by, the first NLP model from the particular set of NLP models, a first annotated natural language document comprising a first set of annotations, wherein the first NLP model is trained to generate the first set of annotations based on contextual information from the natural language document that is of a first length, wherein each annotation in the first set of annotations identifies a sequence of words in the natural language document that is predicted to correspond to the provision at a resolution corresponding to the first length;
providing the first annotated natural language document generated by the first NLP model as an input to the second NLP model, wherein the second NLP model is trained to generate a second set of annotations for the first annotated natural language document based on the first set of annotations and contextual information from the natural language document that is of a second length different than the first length; and
generating, by the second NLP model, an output natural language document comprising the second set of annotations, wherein each annotation in the second set of annotations identifies a sequence of words in the natural language document that is predicted to correspond to the provision at a resolution corresponding to the second length; and
outputting, by the one or more processors, the output natural language document annotated with the second set of annotations for the at least one provision in the set of provisions.

20. The non-transitory computer-readable medium of claim 19, further comprising:
training at least one of the natural language processing (NLP) models, the training comprising:
obtaining, by the one or more processors, a plurality of training natural language documents, wherein each of the plurality of training natural language documents is annotated with one or more provisions and includes domain-specific corpus;
accessing, by the one or more processors, a pre-trained natural language processing (NLP) model, where the pre-trained NLP model is trained to support text classification using a general corpus and includes a plurality of weights, each weight corresponding to a feature used in making a prediction;
identifying, by the one or more processors and for a given provision, a set of positive n-grams and a set of negative n-grams, wherein the set of positive n-grams represents natural language texts that are provisions in the plurality of training natural language documents, and the set of negative n-grams represents natural language texts that are not provisions in the plurality of training natural language documents; and
generating, by the one or more processors, one or more NLP models by fine-tuning the pre-trained NLP model with contextual information from the set of positive n-grams and the set of negative n-grams.

* * * * *